Nov. 25, 1958 R. L. HALVORSON ET AL 2,862,056

RADIO COMMUNICATION SYSTEM

Filed June 22, 1954 2 Sheets-Sheet 1

WITNESSES:
E. A. McBlakey
T. N. Murray

INVENTORS
Robert L. Halvorson
and Frederic S. Beale.
BY F. E. Browder
ATTORNEY

Nov. 25, 1958 R. L. HALVORSON ET AL 2,862,056

RADIO COMMUNICATION SYSTEM

Filed June 22, 1954

2 Sheets-Sheet 2

United States Patent Office 2,862,056

Patented Nov. 25, 1958

2,862,056

RADIO COMMUNICATION SYSTEM

Robert L. Halvorson and Frederic S. Beale, Baltimore, Md., assignors to Westinghouse Electric Corporation, East Pittsburgh, Pa., a corporation of Pennsylvania Application June 22, 1954, Serial No. 438,393

15 Claims. (Cl. 179—2.5)

Figure 1:
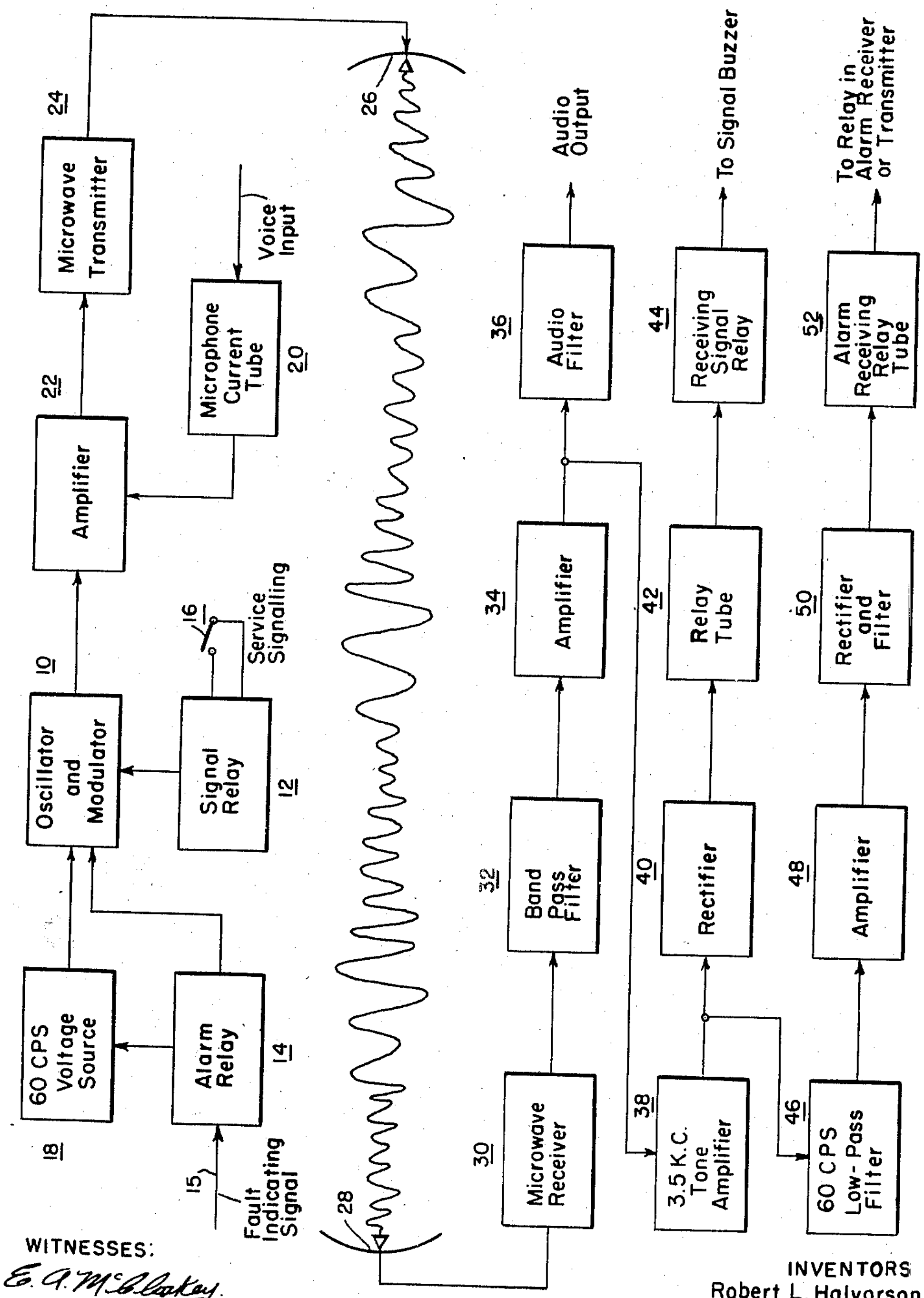

This invention relates to a repeated station radio communication system and more particularly to a system of the type described which is capable of transmitting at least three separate and distinct types of signals.

In a microwave communication system, intelligence signals are transmitted over long distances by many repeater stations which receive signals from a preceding station in the system and transmit these same signals to the next succeeding station. In this type of operation it becomes imperative that voice communication and automatic off-normal alarm facilities be furnished between the many unattended repeater stations in the system. That is, since the repeater stations are often located at isolated or out-of-the-way places, some means must be provided to indicate failure of radio or power equipment, tower light failure, low emergency generator fuel, and other off-normal conditions at each repeater station in the system. In addition, a voice channel, separate and distinct from the main voice channels of the system, must be provided for installation and maintenance communication.

The transmitting or radio-frequency portion of the microwave equipment is designed to handle a plurality (usually 30) two-way voice frequency channels which can be used for either voice or telegraph services or some combination of them. This is accomplished by multiplexing equipment which provides a means whereby a number of voice and other signals may be transmitted and received on a single microwave carrier signal. Each voice channel is provided with a separate sub-carrier frequency in the range between, say, 300 and 600 kilocycles. The sub-carrier is moduated with voice or telegraph intelligence signals to form a moduating signal for microwave carrier energy (usually in the range of 50 megacycles) generated by the transmitting equipment of the system.

In order to provide for automatic off-normal alarm facilities together with maintenance communication, a service channel must be established along with the other voice channels of the system. This service channel must be capable of transmitting three distinct types of signals: (1) alarm signals which indicate off-normal conditions, (2) audio signals, and (3) telephone signals which are defined herein as those preliminary signals which are sent from a calling station to a called station before voice communication is established to indicate that a party at a distant station is "on the line." As will become apparent from the following description, the present invention provides an effective means for establishing a service channel employing a minimum number of parts. Only one oscillator is used in the service channel for both telephone and alarm signals, and a single amplifier tube is employed to combine the telephone and alarm signals with audio signals before feeding the three to a microwave transmitter.

Accordingly, it is an object of this invention to provide a means of voice communication and telephone signaling on a party line basis.

Another object of the invention lies in the provision of means for transmitting failure alarm signals in response to off-normal conditions in a repeater station network.

An important object of the invention is to provide a means for transmitting both telephone and alarm signals in a service channel with the use of a single oscillator.

A still further object of this invention is to provide a receiver system which distinguishes between audio, telephone, and alarm signals and provides for separate outputs for these signals.

Figure 2:
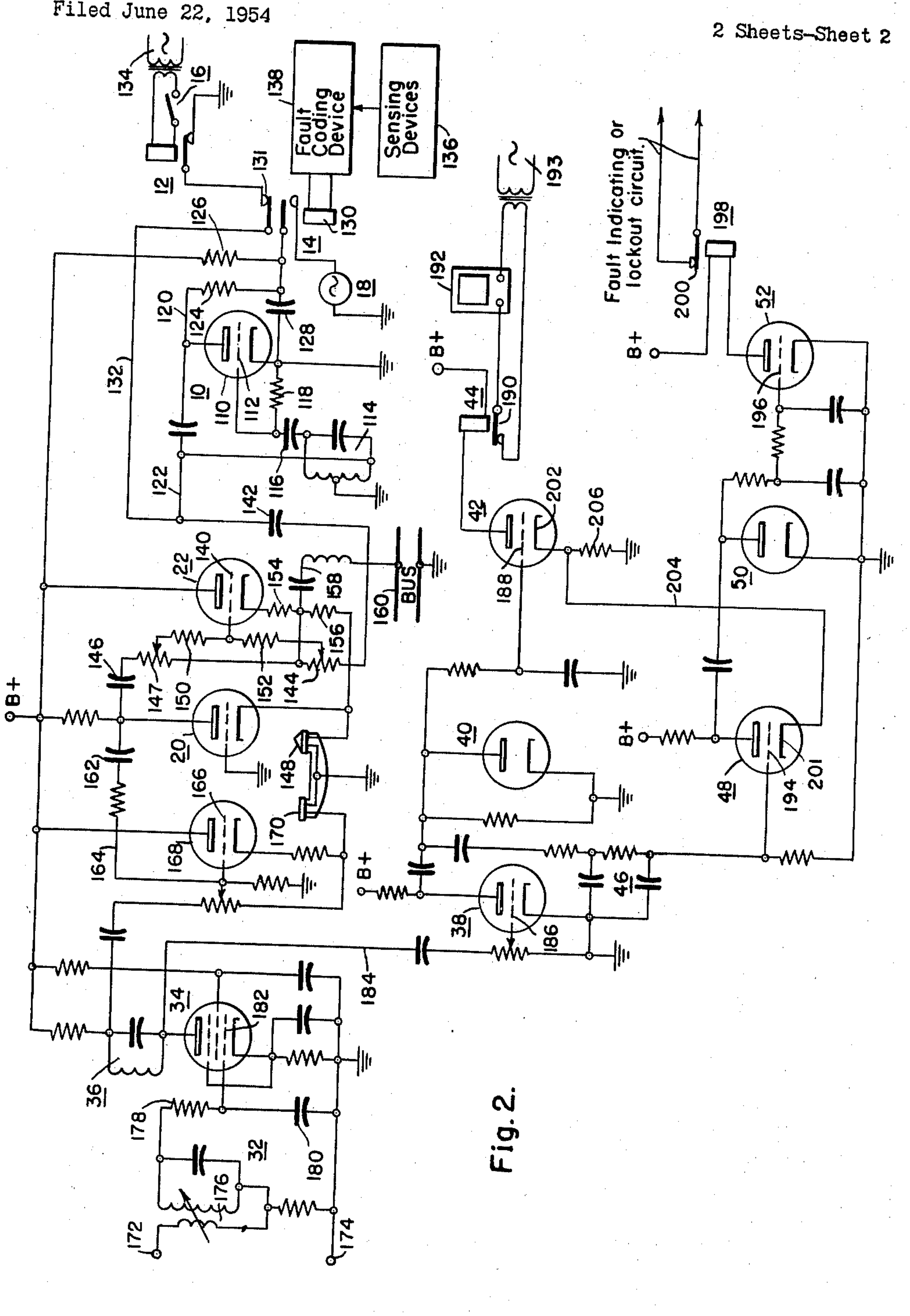

The above and other objects and features of the invention will become apparent from the following description taken in connection with the accompanying drawings which form a part of this specification and in which:

Fig 1 is a block diagram of the service channel of a microwave communications system; and Fig. 2 is a schematic illustration of a typical service channel transmitter-receiver combination which is located at each station in a microwave system.

Referring to Figure 1, the transmitting portion of the system includes a shunt fed Hartley oscillator 10 which may, for example, be tuned to 3.5 kilocycles. The output of the oscillator comprises the telephone signal of the system referred to above. Normally the oscillator is held in a non-oscillating condition until a telephone or alarm signal is to be sent out. Control of the oscillator is effected by two relays 12 and 14. Relay 12 is actuated by a manually operated switch 16 which, when closed, will render oscillator 10 operative. Relay 14 is actuated via path 15 in response to a fault indicating signal which might originate in any one of a number of indicating devices which sense failure of radio equipment, tower light failure, or other off-normal conditions. The relay 14 serves to render oscillator 10 operative regardless of the position of relay 12; it also serves to connect 60 cycle voltage source 18 to the plate circuit of the oscillator to thereby provide oscillator plate modulation. Therefore, if relay 12 is actuated by switch 16 the output of the oscillator will be a pure "tone" or telephone signal. If relay 14 is actuated a telephone signal modulated by 60 cycle voltage will appear at the output terminals of the oscillator. Also included in the transmitting portion of the service channel is a microphone current tube 20 which amplifies a source of audio voltage, not shown. Either or both of the outputs from tube 20 and oscillator 10 are amplified by amplifier 22 to form a moduating signal for the RF microwave carrier energy generated by transmitter 24.

The modulated microwave carrier energy is transmitted from antenna 26 to receiving antenna 28 and, hence, to microwave receiver 30 where the modulating signal output of amplifier 22 is detected. The detected signal is then fed through a band pass filter 32 which presents a high impedance to signals having a frequency above 3.5 kilocycles (the frequency of the telephone signal for the service channel). Audio signals from the service channel are in the range between 200 cycles and 4 kilocycles and alarm signals which modulate the 3.5 kilocycle telephone signal have a frequency of 60 cycles. Therefore, all signals emanating from the service channel, except the higher frequency voice signals, will be passed through filter 32 to amplifier 34. (The 3.5 to 4 kilocycle voice signals are "clipped off" by filter 32; and, hence, the received audio signals are distorted somewhat.) Since the frequencies of all other voice channels in the system are above 3.5 kilocycles, they will not pass through filter 32 so that only received signals from the service channel will be amplified by amplifier 34. Audio signals from amplifier 34 will pass through audio filter 36 which is connected to speech reproducing means, not shown. The 3.5 kilocycle telephone signal and the 60 cycle modulating signal will be blocked by filter 36 and, hence, will be directed to amplifier 38.

The telephone signal and the 60 cycle modulating signal are separated after amplification in amplifier 38. The telephone signal is rectified by rectifier 40, the output of which is used to cut off a relay tube 42. Tube 42, in turn, deenergizes telephone relay 44 when cut off to thereby actuate a telephone buzzer or bell, not shown, which indicates that a calling station is attempting to establish communication. Connected to the output side of amplifier 38 is a 60 cycle low-pass filter 46 which is essentially a low-loss conductance path for any 60 cycle voltage appearing in the received 3.5 kilocycle signal. Filter 46, however, presents a high impedance to signals above 60 cycles per second so that only the 60 cycle signal from source 18 will be amplified by amplifier 48. The amplified 60 cycle signal is fed through rectifier 50 to produce a direct current control voltage which actuates a fault indicating device, not shown, via alarm relay tube 52. Therefore, the telephone relay is actuated whenever oscillator 10 is in operation (to produce a 3.5 kilocycle tone or telephone signal), and the fault indicating device is actuated through relay tube 52 when the telephone signal is modulated with 60 cycle voltage.

A detailed description of the present invention can be found by reference to Figure 2. Parts of the system in Figure 2 which correspond to those parts found in Figure 1, are indicated by the same numerals (underlined). Although the transmitting and receiving portions of the system are disclosed as separate entities in Figure 1, it is to be understood that when a number of repeater stations are used in a communications network, each station must have both transmitting and receiving means as disclosed in Figure 2. In this way any station can transmit signals on a common channel to all other stations in the network, and all stations can receive signals on the common channel from any station in the network.

Referring to Figure 2, the Hartley oscillator 10 comprises a triode tube 110 having its grid 112 connected to a tuned tank circuit 114 through grid condenser 116. Condenser 116, together with grid leak resistor 118, provide cathode bias for tube 110. Two parallel plate circuits 120 and 122 are connected to tube 110. Circuit 120 includes a plate load impedance comprising two separate resistors 124 and 126. Adapted to be connected to the junction between resistors 124 and 126 is one side of the nominal 115 volt A. C. 60 cycle source 18, the other side of which is grounded. Relay 14 normally breaks the connection between circuit 120 and voltage source 18. When relay 14 is closed, plate modulation of oscillator 10 is achieved to give a distinct signal for the alarm function of the system. Also connected to the junction of resistors 124 and 126 is a by-pass condenser 128 which prevents the output of the oscillator from passing through 60 cycle source 18. Solenoid 130 of relay 14 also serves to actuate second normally closed contacts 131 which are included in a path 132 which grounds the plate of the oscillator. Also included in path 132 is normally closed relay 12. A source of voltage 134 may be applied to relay 12 by manually operated switch 16 to thereby break the ground connection. It can thus be seen that the ground connection will be broken when switch 16 is closed to allow oscillator 10 to produce a pure oscillatory telephone signal. When solenoid 130 is actuated the ground connection is again broken, but the output of the oscillator is now an oscillatory signal modulated with 60 cycle voltage.

Relay 14 is controlled by an one of a number of fault sensing devices 136 and a fault coding device 138 which connects a source of voltage, not shown, to relay 14 in response to a fault (i. e., equipment failure) which is sensed by devices 136. For a full description of the fault sensing and coding means, reference may be had to copending application, Serial No. 443,622, filed July 15, 1954.

The output of oscillator 10 is fed through the second parallel plate circuit 122 to the grid 140 of amplifier tube 22. Included in circuit 122 is a coupling condenser 142 and a voltage divider 144 which permits adjustment of the voltage level produced on grid 140. Also connected to grid 140 through coupling capacitor 146 and voltage divider 147 is the plate of the grounded-grid microphone current tube 20 which serves to amplify the audio signals produced by carbon microphone 148. A pair of resistors 150 and 152 isolate each of the circuits connected to grid 140 from the other.

Connected to the cathode of amplifier 22 are bias resistor 154 and cathode follower load resistor 156. To the junction between resistors 154 and 156 is connected a series resonant circuit 158 which leads to the transmit bus 160 of the microwave transmitter. Note that circuit 158 constitutes a cathode follower load for amplifier 22. Other voice channels are also connected to this bus to be directed to the microwave transmitter 24 shown in Figure 1. One side of load resistor 156 is connected to ground through microphone 148. In this way the D. C. current passing through microphone 148 is double what it would be if the cathode of amplifier 22 were connected directly to ground. Hence, the strength of the audio signals produced by microphone 148 is greatly increased.

The anode of microphone current tube 20 is connected through coupling capacitor 162 and path 164 to the grid 166 of audio amplifier tube 168. The cathode of tube 168 is connected to ground through speech reproducing means 170 so that the audio signals produced by microphone 148 will be simultaneously heard by the speaker at speech reproducing means 170.

Received signals from a distant station in the communications network are fed to input terminals 172 and 174 from microwave receiver 30 (shown in Figure 1). The distant station, of course, has an oscillator 10, amplifier 22, and microphone 148 identical to those shown in Figure 2. Input terminals 172 and 174 are connected to a step-up transformer 176, the secondary of which is tuned to 3.5 kilocycles (the frequency of the 3.5 kilocycle signal produced at the distant station by oscillator 10). Transformer 176, resistor 178 and capacitor 180 combine to form the band pass filter 32 which selects service channel signals from the output of the microwave receiver. As was explained in connection with Figure 1, filter 32 presents a high insertion loss to signals having a frequency above 3.5 kilocycles and, hence, will pass only the modulated or unmodulated 3.5 kilocycle signal and the audio signals produced by a service channel at some distant station. All of the signals produced by the other voice channels in the microwave system and received by receiver 30 are above 3.5 kilocycles and, therefore, will not pass through filter 32.

From filter 32, the received signals are impressed on control grid 182 of pentode amplifier 34. Any audio signals which are amplified by amplifier 34 will pass through audio filter 36 to be impressed on the grid 166 of audio amplifier tube 168. The audio signals will, therefore, be transformed into audible sounds by speech reproducing means 170.

Filter 36 is tuned to present a high impedance to the 3.5 kilocycle signal which may or may not be modulated by 60 cycle voltage. Hence, this signal will be by-passed through path 184 to the grid 186 of amplifier 38. The 3.5 kilocycle signal from amplifier 38 will be rectified by rectifier 40; and the output of rectifier 40 will be impressed on grid 188 of relay tube 42. Current will normally pass through tube 42 to energize telephone relay 44 which, when energized, holds its contacts 190 in open position. However, when a rectified 3.5 kilocycle telephone signal is impressed on grid 188 of relay tube 42, the tube is cut off and contacts 190 closed to actuate a signal buzzer 192 which is energized by voltage source 193. It can thus be seen that signal buzzer 192 will be actuated whenever a 3.5 kilocycle signal is received.

Connected to amplifier 38 is 60 cycle low pass filter 46. If the received 3.5 kilocycle signal is modulated with 60 cycle voltage, only the 60 cycle modulating component will be passed through filter 46 to be impressed on grid 194 of amplifier 48. The output of the amplifier will be rectified by rectifier 50 to produce a control voltage which is impressed on grid 196 of alarm relay tube 52. Tube 52 normally energizes a lock-out relay 198 which holds its contacts 200 in open position. When a rectified 60 cycle voltage is impressed on grid 196, tube 52 is cut off, and relay 198 is deenergized to close contacts 200. These contacts are included in a circuit, not shown, which indicates that a fault is present somewhere in the system. For a complete description of the fault indicating and/or lockout circuit, reference may be had to the aforesaid copending application Serial No. 433,622 filed July 15, 1954. Therefore, whenever a received 3.5 kilocycle signal produced by oscillator 10 is modulated with 60 cycle voltage, contacts 200 will be closed to indicate the presence of a fault in the system.

Due to certain transient conditions which exist when a telephone signal is first received, low pass filter 46 will allow some of the 3.5 kilocycle telephone signal to leak through to grid 194 of amplifier 48. That is, when a telephone signal by itself is first received at input terminals 172 and 174, relay 44 operates in the desired manner; but there is a tendency for relay 198 to operate momentarily also. This action leads to false triggering of the fault indicating circuit. False triggering arises from the fact that filter 46 cannot distinguish between a true 60 cycle alarm signal and the initial steep wave front of the 3.5 kilocycle signal from oscillator 10.

A solution to the false triggering problem is achieved in the present invention by connecting the cathode 201 of amplifier 48 to the cathode 202 of relay tube 42 through path 204. Now, when relay tube 42 is initially cut off in response to a received telephone signal, cathode 201 is driven negative by reason of the plate current being cut off in tube 42. The cathode 202 of tube 42 is normally positive above ground by an amount equal to the voltage drop across cathode resistor 206. However, when tube 42 is cut off, the potential of cathode 202 immediately drops in a negative direction. Since cathode 202 is also connected to cathode 201, the latter cathode will go negative at the same instant that the grid 194 goes negative due to the transient condition referred to above. Thus, the potential on cathode 201 will "buck" that on grid 194 to prevent conduction (false triggering) in amplifier 48.

*Operation of the system*

If a party at one station in the microwave communications network wishes to establish communication with another party at some distant station via the service channel, he will simply close manually operated switch 16. This action will break the connection between the plate of oscillator 10 and ground by virtue of the action of relay 12. Hence, a 3.5 kilocycle telephone signal will be impressed on grid 140 of amplifier 22 to be transmitted to the other stations in the network via transmit bus 160. At a distant station the telephone signal will be received and will pass through transformer 176 and pass filter 32 to the control grid 182 of amplifier 34. After amplification, the telephone signal will not pass through audio filter 36. It will be directed through path 184 to the grid 186 of amplifier 38. From amplifier 38, the telephone signal will be rectified by rectifier 40 to produce a D. C. voltage which cuts off relay tube 42. This action causes contacts 190 of telephone relay 44 to close, thereby energizing signal buzzer 192. By a simple party line coding system whereby each station in the system is designated by a certain number of long or short buzzer sounds, the calling party may signal any particular station in the system.

After the called party is aware that another station is attempting to reach him, he will lift the handset at his station and will converse with the calling party. Voice communication is accomplished by virtue of the fact that the microphone current tube 20 in each of the stations is connected to the grid 140 of amplifier tube 22. From amplifier 22 the audio signals are impressed on transmit bus 160 to be transmitted to the other distant station. After detection in microwave receiver 30 at the distant station, the audio signals pass through uadio filter 36 and, hence, to speech reproducing means 170.

If a fault such as power failure should occur at any station in the system, relay 14 at that station will be energized to (1) break the connection between the plate of oscillator 10 and ground so that the oscillator becomes active, and (2) plate modulate the oscillator with 60 cycle voltage. The modulated 3.5 kilocycle oscillator output will be transmitted via amplifier 22 and transmit bus 160 to another station in the system where it will be directed through amplifier 34 and path 184 to the grid 186 of amplifier 38. The 3.5 kilocycle component of the modulated signal from oscillator 10 will pass through rectifier 40 and telephone relay tube 44 to actuate buzzer 192. At the same time, the 60 cycle modulating component of the received signal will pass through filter 46 and amplifier 48 to actuate lock out relay 198. When contacts 200 of relay 198 close, the fault indicating or lockout circuit is completed to thereby indicate that a fault exists in the system.

Relay 198 has two functions, depending upon whether it is located at a station which is transmitting a fault or a station which is receiving a fault. At a fault transmitting point relay 198 serves to "lock out" its associated alarm coding or transmitting device 138 when another station occupies the service channel for transmitting a fault signal. In this way fault signals from a number of points are prevented from simultaneously occupying the single service channel; and, hence, confusion between simultaneous fault signals is prevented regardless of the total number of faults being reported. Since only one fault signal can be reported at any one time by this method, means (not shown) are provided in conjunction with the fault lockout circuit for "storing" all but one of the simultaneous fault signals while that one signal is being transmitted. The "stored" signals are then transmitted in succession so that the system dispatcher becomes aware of each of the faults regardless of their simultaneous occurrence.

At a station which is receiving a fault signal relay 198 (together with an alarm de-coding device, described in co-pending application Serial No. 433,622, filed July 15, 1954) serves as part of means for translating the received alarm signals into a visual display of lamps on an indicator. By observing the lamp display on the indicator, the system dispatcher is made aware of both the type and location of abnormal condition in the repeater station microwave network.

Ordinarily either audio signals by themselves or the 3.5 kilocycle signal (modulated or unmodulated) by itself is impressed on grid 140 of amplifier 22. It is, however, possible that both or all of these signals be combined and impressed on grid 140 simultaneously. In the latter case the signals will be superimposed and transmitted simultaneously via transmit bus 160. When the superimposed signals are received at a distant station they will be separated into their respective channels in the same manner as they would be if only one signal were transmitted at any one time.

It can thus be seen that the present invention provides transmitting means for voice, telephone, and alarm signaling together with receiving means for separating the three signals into separate outputs. It is to be understood that although the invention has been described in connection with a specific embodiment, it is not limited thereto since it is apparent to those skilled in the art that various changes in size and arrangement of parts can be made without departing from the spirit and scope of the invention.

We claim as our invention:

1. A receiving and transmitting system for audio, telephone and alarm signals comprising a normally inoperative oscillator, a source of alternating current alarm voltage, means for selectively rendering said oscillator operative to produce a telephone signal, means for selectively modulating the telephone signal with alarm voltage, a source of audio signal voltage, a single triode tube for amplifying both the audio voltage and the output of said oscillator, means connected to the cathode of said triode for transmitting both the amplified audio and telephone signals, a receiver located at some distant point for receiving the transmitted audio and telephone signals, speech reproducing means included in said receiver, means for separating received audio signals from a received telephone signal and for applying said audio signals to the speech reproducing means, a device included in said receiver for producing a direct current voltage in response to a received telephone signal, and means connected to said last-mentioned device for producing a direct current alarm voltage only when a received telephone signal is modulated with said source of alternating current alarm voltage.

2. A receiving and transmitting system for audio, telephone and alarm signals comprising a normally inoperative oscillator, a source of alternating current alarm voltage, means for selectively rendering said oscillator operative to produce a telephone signal, means for selectively modulating the telephone signal with alarm voltage, a source of audio signal voltage, means for amplifying both the audio voltage and the output of said oscillator, means for transmitting both the amplified audio and telephone signals, a receiver located at some distant point for receiving the transmitted audio and telephone signals, speech reproducing means included in said receiver, means for separating received audio signals from a received telephone signal and for applying said audio signals to the speech reproducing means, a device included in said receiving means for producing a direct current voltage in response to a received telephone signal, and means connected to said last-mentioned device for producing a direct current alarm voltage only when a received telephone signal is modulated with said source of alternating current alarm voltage.

3. A signal receiving and transmitting system comprising means for modulating an oscillatory signal with alarm signals, a source of audio signal voltage, means for generating a carrier signal and for modulating said carrier signal with the modulated oscillatory signal and with audio signals, means for transmitting the moduated carrier signal, a receiver located at a distant point with respect to the transmitting means for demodulating said carrier signal to recover said moduated oscillatory signal and said audio signals, said receiver including means for separating the audio, oscillatory and alarm signals, speech reproducing means responsive to the separated audio signals, a first device responsive to the separated oscillatory signal for producing a direct current voltage, and a second device responsive to the separated alarm signals for producing a direct current voltage.

4. A signal receiving and transmitting system comprising means for modulating an oscillatory signal with alarm signals, a source of audio signals, means for generating a carrier signal and for modulating said carrier signal with the modulated oscillatory signal and with said audio signals, means for transmitting the modulated carrier signal, a receiver located at a distant point with respect to the transmitting means for said signals, said receiver including means for separating the audio, oscillatory and alarm signals, means responsive to the separated oscillatory signal for producing a first direct current voltage, and means responsive to the separated alarm signal for producing a second direct current voltage.

5. In combination with a signal transmitter, a normally inoperative oscillator, first and second parallel plate circuits for said oscillator, an operator-operated relay actuable to render said oscillator operative, plate modulating means included in the first of said plate circuits, a device responsive to an alarm signal for actuating said modulating means, said device also serving to render said oscillator operative during actuation of the modulating means regardless of the position of said operator-operated relay, a source of audio signal voltage, means for combining the audio voltage with the output of said oscillator, said latter-mentioned means including an electron discharge tube having a control grid included therein, a connection between said grid and said oscillator through the second of said oscillator plate circuits, and a connection between said grid and said source of audio voltage whereby both audio signals and the output of said oscillator will be impressed on said grid.

6. In combination with a signal transmitter, a normally inoperative oscillator, first and second parallel plate circuits for said oscillator, a source of plate modulating voltage included in the first of said plate circuits, a source of audio signal voltage, means adopted for combining the audio signal voltage with the modulated output of said oscillator, said latter-mentioned means including an electron discharge tube having a control grid included therein, a connection between said grid and said oscillator through the second of said oscillator plate circuits, and a connection between said grid and the audio signal source whereby both the audio signals and the output of said oscillator will be impressed on said grid.

7. In combination with a signal transmitter, a normally inoperative oscillator, first and second parallel plate circuits for said oscillator, an operator-operated relay actuable to render said oscillator operative, plate modulating means included in the first of said plate circuits, a device responsive to an alarm signal for actuating said modulating means, said device also serving to render said oscillator operative during actuation of the modulating means regardless of the position of said operator-operated relay, a source of audio signal voltage, and means connected to said audio signal source and the second of said oscillator plate circuits for combining the audio signals with the output of said oscillator.

8. In combination with a signal transmitter, a normally inoperative oscillator, a plurality of plate circuits for said oscillator, an operator-operated relay actuable to render said oscillator operative, plate modulating means included in at least one of said plate circuits, a device responsive to an alarm signal for actuating said modulating means, said device also serving to render said oscillator operative during operation of the modulating means regardless of the position of said operator-operated relay, a source of audio signal voltage, and means for combining the audio signal voltage with the output of said oscillator.

9. In combination with first, second and third oscillatory signal sources, means for modulating said first signal with said second signal, means for generating a carrier signal and for modulating said carrier signal with the modulated first signal and with said third signal, means for demodulating said carrier signal to recover the modulated first signal and said third signal, means for separating said third signal from the modulated first signal, separate signal channels for said first and second signals, filter means for separating said first and second signals and for feeding the first signal into one of said channels and the second signal into the other of said channels, means in the channels for producing first and second direct current voltages respectively in response to said first and second signals, and first and second electrical utilization devices operable in response to said first and second direct current voltages respectively.

10. In a receiving system for audio signals and a telephone signal which may or may not be modulated with alarm signals, the combination of an electron discharge tube for amplifying received signals, means included in the plate circuit of said tube for presenting a high impedance to alarm and telephone signals and a low impedance to audio signals, speech reproducing means connected to said plate circuit, a first triode tube having its grid connected to the positive terminal of said electron discharge tube, means for rectifying the output of said first triode, a second triode tube having its grid connected to the output of said rectifying means whereby the second triode is cut-off in response to received telephone signals, a telephone signaling device, means for energizing said device when the second triode is cut-off, a third triode having its grid connected to the anode of said first triode and its cathode connected to the cathode of said triode to thereby suppress conduction in said third triode when only pure telephone signals are received by said system, means included in the connection between the first and third triodes for suppressing signals other than alarm signals, and means connected to said third triode for producing a direct current control voltage in response to alarm signals received by said system.

11. In a receiving system for audio signals and a telephone signal which may or may not be modulated with alarm signals, the combination of an electron discharge tube for amplifying received signals, means included in the plate circuit of said tube for presenting a high impedance to alarm and telephone signals and a low impedance to audio signals, speech reproducing means included in said plate circuit, a first triode tube having its grid connected to the positive terminal of said electron discharge tube, means for rectifying the output of said first triode, a second triode tube having its grid connected to the output of said rectifying means whereby the second triode is cut-off in response to received telephone signals, a telephone signalling device, means for energizing said device when the second triode is cut-off, and means connected to the anode of said first triode for producing a direct current control voltage in response to alarm signals received by said system.

12. In a receiver for audio signals and a telephone signal which may or may not be modulated with alarm signals, the combination of an electron discharge tube for amplifying received signals, an anode circuit for said tube means included in the anode circuit of said tube for presenting a high impedance to alarm and telephone signals and a low impedance to audio signals, speech reproducing means connected to said anode circuit, a telephone signaling device, means including a triode tube having its grid connected to the anode of said discharge tube for energizing said signaling device in response to received telephone signals, and means connected to the anode of said triode for producing a direct current control volgtage in response to received alarm signals.

13. In a receiver for audio signals and a telephone signal which may or may not be modulated with alarm signals, the combination of an electron discharge tube for amplifying received signals, means included in the plate circuit of said tube for presenting a high impedance to alarm and telephone signals and a low impedance to audio signals, speech reproducing means connected to said plate circuit, a telephone signaling device, means connected to said electron discharge tube for energizing said signaling device in response to received telephone signals, and means connected to said latter-mentioned means for producing a direct current control voltage in response to received alarm signals.

14. In a receiver for a complex signal having audio, telephone and alarm signal components, speech reproducing means, means for separating the audio component of said signal from the other components and applying said audio component to the speech reproducing means, a telephone signalling device, means responsive to the telephone signal for producing a direct current voltage for energizing said device, and means responsive to the alarm component for producing a direct current control voltage.

15. In combination with a signal transmitter, an oscillator, first and second output circuits for said oscillator, a source of modulating voltage included in the first of said output circuits, a source of audio signal voltage, and means including a signal translating device connected to said audio source and the second of said oscillator output circuits for combining the audio signals with the output of said oscillator.

References Cited in the file of this patent

UNITED STATES PATENTS

| | | |
|---|---|---|
| 1,936,162 | Heising | Nov. 21, 1933 |
| 2,202,474 | Vroom | May 28, 1940 |
| 2,515,619 | Weyers | July 18, 1950 |